(12) United States Patent
Cieslinski et al.

(10) Patent No.: US 8,248,477 B2
(45) Date of Patent: Aug. 21, 2012

(54) IMAGE RECORDING SYSTEM AND METHOD OF CALIBRATING, COMPRESSING AND DECOMPRESSING IMAGE SIGNAL VALUES

(75) Inventors: Michael Cieslinski, Ottobrunn (DE); Achim Oehler, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 2 days.

(21) Appl. No.: 13/024,761

(22) Filed: Feb. 10, 2011

(65) Prior Publication Data

US 2012/0154603 A1    Jun. 21, 2012

(30) Foreign Application Priority Data

Dec. 20, 2010    (DE) .......................... 10 2010 055 229

(51) Int. Cl.
*H04N 17/00* (2006.01)
(52) U.S. Cl. ........................ 348/187; 348/188
(58) Field of Classification Search .................. 348/187, 348/188, 175, 176, 241, 254, 255, 572; 702/81, 702/82, 116, 121, 123
See application file for complete search history.

(56) References Cited

U.S. PATENT DOCUMENTS

| | | | | |
|---|---|---|---|---|
| 4,314,281 A * | 2/1982 | Wiggins et al. | ............... | 358/406 |
| 5,033,015 A * | 7/1991 | Zwirn | ............... | 702/116 |
| 5,467,128 A * | 11/1995 | Yates et al. | ............... | 348/187 |
| 5,508,822 A * | 4/1996 | Ulichney et al. | ............... | 358/3.1 |
| 5,565,916 A * | 10/1996 | Katayama et al. | ............... | 348/321 |
| 5,726,915 A * | 3/1998 | Prager et al. | ............... | 702/116 |
| 5,742,405 A * | 4/1998 | Spaulding et al. | ............... | 358/3.1 |
| 7,289,054 B1 * | 10/2007 | Watanabe | ............... | 341/156 |
| 7,466,344 B2 * | 12/2008 | Bleau et al. | ............... | 348/211.11 |

(Continued)

FOREIGN PATENT DOCUMENTS

DE    10 2009 004 187 A1    7/2010

(Continued)

OTHER PUBLICATIONS

German Search Report dated Nov. 22, 2011. DE 10 2010 055 229.1.

*Primary Examiner* — Victor Kostak
(74) *Attorney, Agent, or Firm* — Gifford, Krass, Sprinkle, Anderson & Citkowski, P.C.

(57) ABSTRACT

A method of calibrating, compressing and decompressing image signal values of an image sensor which has a plurality of light sensitive pixels arranged in rows and columns comprises the steps of: reading out the image signal values; compressing the image signal values; and decompressing the compressed image signal values, wherein the image signal values are calibrated while using calibration data sets which include a number of calibration values for each pixel. The method is characterized in that each calibration data set includes at least one first calibration value and at least one second calibration value, wherein the calibration of the image signal values includes a first calculation step which is carried out by the compression of the image signal values in order to calculate partly corrected image signal values while using the at least one first calibration value, and wherein the calibration of the image signal values includes a second calculation step which is carried out after decompressing the image signal values in order to calculate fully corrected image signal values while using the at least one second calibration value. An image recording system uses a corresponding method.

17 Claims, 3 Drawing Sheets

U.S. PATENT DOCUMENTS

| | | | |
|---|---|---|---|
| 7,567,273 B2 * | 7/2009 | Knoedgen et al. | 348/187 |
| 7,719,595 B1 * | 5/2010 | Johnson et al. | 348/333.01 |
| 8,094,215 B2 * | 1/2012 | Richardson | 348/241 |
| 2003/0174894 A1 | 9/2003 | Matherson et al. | |
| 2004/0008279 A1 * | 1/2004 | Kang | 348/572 |
| 2004/0189805 A1 * | 9/2004 | Seitz | 348/188 |
| 2005/0212970 A1 * | 9/2005 | Joskin | 348/572 |
| 2006/0001921 A1 * | 1/2006 | Bailey et al. | 358/504 |
| 2006/0103743 A1 * | 5/2006 | Ono | 348/257 |
| 2008/0158363 A1 * | 7/2008 | Myers | 348/187 |
| 2009/0027504 A1 * | 1/2009 | Lim et al. | 348/187 |
| 2009/0033778 A1 * | 2/2009 | Bleau et al. | 348/294 |
| 2009/0059012 A1 * | 3/2009 | Noguchi et al. | 348/187 |
| 2010/0096184 A1 * | 4/2010 | Ambo et al. | 174/72 A |
| 2010/0141805 A1 | 6/2010 | Chen | |

FOREIGN PATENT DOCUMENTS

| | | |
|---|---|---|
| JP | 03-252274 A | 11/1991 |
| JP | 2001-045380 A | 2/2001 |

* cited by examiner

IMAGE RECORDING SYSTEM AND METHOD OF CALIBRATING, COMPRESSING AND DECOMPRESSING IMAGE SIGNAL VALUES

The invention relates to a method of calibrating, compressing and decompressing image signal values of an image sensor which has a plurality of light sensitive pixels arranged in rows and columns, comprising the steps: reading out the image signal values; compressing the image signal values; and decompressing the image signal values, wherein the image signal values are calibrated while using calibration data sets which include a number of calibration values for each pixel. The invention further relates to an image recording system having an image sensor which has a plurality of light sensitive pixels arranged in rows and columns; furthermore having a readout device for reading out image signal values from the pixels; a calibration device for generating calibration data sets which include a number of calibration values for each pixel; a compression device for compressing the image signal values; a decompression device for decompressing the compressed image signal values; and having evaluation means which are configured to calibrate the image signal values while using the calibration data sets. The named method and the named image recording system in particular relate to the generation and processing of motion picture data of an electronic motion picture camera which correspond to a sequence of sequentially taken images.

The light sensitive pixels of an electronic image sensor generate, in dependence on the brightness of the incident light, analog image signal values which are converted to digital image signal values by means of an A/D converter in a subsequent processing stage. The image signal values of all pixels thus represent a reproduction of the taken scene which can be stored and played back on a suitable device at a later time, for example on a monitor or by means of a projection apparatus.

The images generated by such image sensors frequently have fixed pattern noise (FPN) which makes itself noticeable as inhomogeneities in an actually homogeneous image and is above all due to production tolerances of the individual pixels. On the reading out, image signal values are generated which also have a value different from zero and are different from pixel to pixel with completely unexposed pixels. This contribution to the fixed pattern noise is called an offset artifact.

The pixels furthermore usually have slightly different light sensitivities or amplification factors so that an absolutely homogeneous illumination generates slightly different image signal values. The measure of the variations in the light sensitivities or in the amplification of the individual pixels is frequently not constant over the total sensitivity range, but rather additionally still has nonlinearities. This effect is called a gain artifact. Both artifacts are manifested in that surfaces which are regular or homogeneous per se in a taken image have a pattern not present in reality.

Electronic image sensors are increasingly also used in cameras for taking image sequences which should later be shown in a movie theater. In this respect, very high demands are made on the quality of the taken images and also on the resolution. It is additionally desirable that cameras having electronic image sensors simultaneously have a high frame repetition rate so that slow motion shots also become possible.

For example, for an image having a resolution of 4096×3072 pixels, image sensors are thus used which have a resolution of 5888×4000 pixels. In order also to allow slow motion shots for sports shots, image sensors are read out having frame repetition rates of 200 frames per second, for example.

To achieve the required image quality, in particular necessary for movie theater projections, it is necessary to remove the fixed pattern noise contained in the images reliably by calculation. This procedure is also termed calibrating. For this purpose, so-called calibration data sets are generated which are acquired from a plurality of calibration images which were taken under exactly defined, usually homogeneous illumination conditions. For example, a correction of the offset can take place in that a so-called "offset image" taken without illumination is subtracted pixel-wise from a nonprocessed image or raw image. To correct the gain artifact, the offset-corrected image is divided by a so-called "gain image" which was taken with homogeneous illumination and was optionally normed to a mean value.

To correct nonlinear gain artifacts, it is furthermore possible to take a gain correction image for different illumination intensities and to acquire pixel-wise by suitable interpolation methods from the illumination series thus acquired a nonlinear function which describes the sensitivity of the respective pixel in dependence on the illumination intensity.

To carry out a high-quality calibration of the raw image data, calibration data sets are, for example, required for every pixel which have six to eight calibration values which each have a data depth of 16 bits, The extent of the calibration values is thus higher by a multiple than the extent of the pixel data which can, for example, comprise 2×14 bits per pixel with an image sensor having two outputs.

Carrying out such a complex calibration directly after the taking of the individual images in the camera comes up against technical difficulties since processing units having a very high image processing power are required for the required high data rates which results for the resolutions and frame repetition rates initially named by way of example. This is associated with a high energy pick-up and a corresponding performance loss, which can in particular result in substantial disadvantages such as lower battery life or thermal problems with a portable camera.

It is furthermore necessary to compress the image data, i.e. the named image signal values, for the data recording in order to reduce the data quantity. In order at least to avoid the problem of the calibration within the camera, there is the possibility of first compressing the image data without calibration, of recording the compressed image data and of only carrying out the required calibration after the decompression in an external processing unit which has the desired performance capability. Since, however, a high portion of fixed pattern noise is superimposed on the actual image information with the uncalibrated image data, the compression is negatively influenced, which can in particular result in insufficient compression rates or also in compression artifacts.

It is therefore the object of the invention to improve the image quality and the compression rate with the initially named method and image processing and image recording system.

The object is satisfied by a method having the features of claim 1 and in particular in that each calibration data set includes at least one first calibration value and at least one second calibration value, wherein the calibration of the image signal values includes a first calculation step which is carried out before the compression of the image signal values in order to calculate partly corrected image signal values while using the at least one first calibration value, and wherein the calibration of the image signal values includes a second calculation step which is carried out after the decompression of the image signal values in order to calculate fully corrected image signal values while using the at least one second calibration value.

So many calibration values or correction values are accordingly determined in the generation of the calibration data sets as are necessary to obtain the desired image quality on the calibration. In the first calculation step, which precedes the compression of the image signal values, only a portion of the calibration values present in the respective calibration data set is, however, used for a calibration, namely the so-called first calibration values. This "precalibration" requires a substantially lower calculation effort than would be required for a complete calibration while utilizing all the calibration values present in the calibration data set.

The largest possible image calibration is admittedly not yet achieved by the precalibration, but it is sufficient in order subsequently to carry out a compression of the image signal values with high compression rates largely free of interference and artifacts.

In the second calculation step, a so-called "postcalibration" of the decompressed image signal values is then carried out in order ultimately to obtain fully corrected, i.e. fully calibrated, image data so that these image data substantially no longer contain any fixed pattern noise and thus have the desired image quality. For this purpose, the further calibration values (the so-called second calibration values) are used and optionally also the first calibration values of the precalibration.

"Fully corrected image signal values" has the meaning in connection with the invention that the available calibration values have been fully applied to the image signal values. However, this does not preclude carrying out still other corrections or conversions on the image signal values later.

It is possible using the method in accordance with the invention both to increase the compression rate and to minimize any artifacts associated with the compression. Simultaneously, the calculation power required for carrying out the precalibration is kept small so that the precalibration, that is the first calculation step, can already be carried out within a camera including the image sensor.

The compression of the image signal values after the "precalibration" can take place in accordance with any desired conventional process. In this respect, a process is preferred in which the image signal values are compressed in a lossless manner or with a guaranteed quality, wherein image signal values having a large deviation from an associated standard value or mean value are also processed with only a small error.

In accordance with an advantageous embodiment of the invention, the compression step includes a compression of the partly corrected image signal values. The second calculation step preferably includes the calculation of the fully corrected image signal values from the decompressed, partly corrected image signal values.

It is furthermore preferred if the bit depth of the first calibration value is smaller than the bit depth of a total calibration value including the first and second calibration values. For example, a calibration value having a precision or bit depth of 16 bits is required for the carrying out of an offset correction with the desired quality. This total calibration value is divided into a first and a second calibration value which each e.g. have a bit depth of 8 bits. In this case, the first calibration value can include the 8 bits with the lowest significance, whereas the second calibration value includes the 8 bits with the highest significance. A calibration value for the gain correction can accordingly also be divided into a first and a second gain calibration value having e.g. 8 bit precision in each case. Due to the lower bit depth of the first calibration value, it may occur that a specific number of pixels, which have a particularly large deviation from a mean value with respect to the offset and/or to the gain, also have a specific, visually perceivable residual portion of fixed pattern noise after the application of the first correction values. However, this does not play a significant role for the compressibility of the image signal values since the number of such pixels is very small with respect to the total number of all pixels of the image sensor. The deviations from a mean value with respect to the offset and/or the gain for the larger part of the pixels and thus the calibration values are namely small so that an almost full calibration is already achieved in the precalibration. The first calibration value does not necessarily have to include the least significant bit, but can rather also correspond to the eight bits with the 3rd to 10th significance in the aforesaid example (precision or bit depth of 16 bits).

It is furthermore also possible to use first calibration values with a reduced precision and second calibration values which have the same precision as the originally determined total calibration values. In this case, the postcalibration takes place while using the precalibrated image signal values, wherein a nonlinear postcalibration can, for example, sill be carried out after a linear precalibration. Such a procedure requires that it is taken into account in the generation of the second calibration values that the later application of the second calibration values takes place while using the already carried out (and known) precalibration.

In accordance with an advantageous embodiment, the method furthermore includes a storage of the compressed image signal values.

In accordance with a further advantageous embodiment, the first calibration value includes at least one offset correction value and/or one gain correction value, It is thereby possible already to remove a substantial portion of fixed pattern noise from the image data by calculation in the precalibration.

It is furthermore preferred that the second calibration value includes at least one value for correcting nonlinearities of the pixel sensitivity. The second calibration values can, for example, be higher order polynomial coefficients so that those artifacts can also be corrected in the postcalibration which can occur with high dynamics or with a high degree of contrast in the image.

In accordance with a further preferred embodiment of the invention, the reading out of the image signal values include at least one first and one second reading out in order to generate at least one first and one second image signal value for each pixel, wherein the first image signal value and the second image signal value are generated using different amplification factors. Such a readout is also called a dual gain readout and serves to increase the dynamic extent or the degree of contrast of the image sensor.

At least one common first calibration value, in particular a common gain correction value, is preferably used for calculating the partly corrected image signal values for the first image signal value and for the second image signal value of the respective pixel, wherein separate second calibration values are used for calculating the fully corrected image signal values for the first image signal value and for the second image signal value of the respective pixel. It is thereby not necessary also to double the calibration values to be processed simultaneously with the doubling of the image signal values caused by the dual gain architecture. For example, two respective offset calibration values are therefore used for the first and second image signal values; however, instead of two gain calibration values, a single common gain calibration vale is sufficient at least in the precalibration.

In accordance with a further advantageous embodiment of the invention, (apart from a transition region) only the first image signal value or the second image signal value is compressed in dependence on the magnitude of the image signal value. It is thus, for example, not necessary also to store the low-amplified image signal value in addition to the high-amplified image signal value with relatively dark image signal values. Conversely, with very bright image signal values, the high-amplified image signal value, which is anyway usually overloaded, does not also have to be saved in addition to the low-amplified image signal value to be saved. The respective image signal value not required is therefore discarded. A corresponding limit value for the magnitude of the image signal value is in particular defined for the decision whether the first or the second image signal value is to be compressed.

In accordance with an embodiment, only the first image signal value or the second image signal value is compressed for a transition range of the magnitude of the image signal values of the respective pixel (i.e. with a mean brightness). In other words, in this case, only a single image signal value is always compressed for each pixel, whereby the calculation and storage effort is minimized. It is alternatively also possible to compress both the first and the second image signal value for such a transition range so that a "soft" transition can be brought about between the two image signal values or the underlying amplification values after the postcalibration.

It is, however, particularly advantageous if either the first image signal value or the second image signal value is compressed for a transition range of the magnitude of the image signal values of the respective pixel, wherein a difference value is additionally compressed which is determined as the difference between the first image signal value and the second image signal value. "Hard" transitions can thereby likewise be avoided between the first image signal value and the second image signal value and cross-fading between the two channels can take place. Since the difference value is small as a rule, a smaller bit depth is, however, sufficient for its encoding.

In accordance with a further preferred embodiment of the invention, the calibration values are generated while using nonlinear quantification characteristics, wherein such calibration values which characterize small deviations from a standard value have smaller quantification steps than those calibration values which characterize relatively large deviations from the standard value. A mean value for the offset or a mean sensitivity or a mean amplification of the image sensor can, for example, be defined as the standard value.

It is furthermore preferred if the at least one first calibration value and/or the at least one second calibration value is/are compressed and decompressed together with the image signal values. In other words, in this embodiment, not only the image signal values, but also the first calibration value or values and/or the second calibration value or values within the same data stream, are compressed, optionally stored and/or transmitted in compressed folia and decompressed later. The image signal values and the respective calibration values thus form a single file, i.e. a common image data set. The respective calibration values are hereby directly available in the postcalibration in order to be able to be used for the postcalibration. At least the second calibration value or values are preferably compressed and decompressed together with the image signal values, in particular when only the second calibration value or values is/are used for the named second calculation step (postcalculation). A compression and cotransfer of the first calibration values is in particular of advantage when the first calibration value or values should also be used for the named second calculation step.

In this embodiment, the respective calibration values (first and/or second calibration value) can be embedded as metadata, i.e. as visually non-perceivable data, into the image signal values to which image signal values are added and/or are prefixed to the image signal values. In this respect, the image signal values and the respective calibration values form a common image data set.

The calibration value or values can in particular be integrated into the image signal values of each individual image of the respective image data sequence in the case of motion picture data of an electronic motion picture camera, i.e. in the case of an image data sequence. The calibration value or values can hereby selectively be extracted from every individual image of the respective image data sequence even if only a portion of the respective image data sequence is looked at or if the image data sequence is only present in incomplete form. Alternatively to this, it is, however, also possible that the calibration value or values are only taken in a start section or an end section of the respective image data sequence, wherein a reference to the start section or the end section of the image data sequence is integrated into the image signal values of each image of the respective image data sequence. The calibration value or values are thus only transferred at the start or at the end of the image data sequence.

The object of the invention is furthermore satisfied by an image recording system having the features of the independent apparatus claim and in particular in that each calibration data set includes at least one first calibration value and at least one second calibration value, and in that the evaluation means include a first evaluation unit which is configured to calculate partially corrected image signal values while using the at least one first calibration value and a second evaluation unit which is configured to calculate fully corrected image signal values while using the at least one second calibration value, wherein the compression device is configured for compressing the partially corrected image signal values and the second evaluation unit is configured for calculating the fully corrected image signal values from the decompressed, partially corrected image signal values.

Further advantageous embodiments of the invention are set forth in the claims, in the description and in the drawings.

The invention will be described in the following with reference to an embodiment and to the drawings. There are shown.

Figure 1:
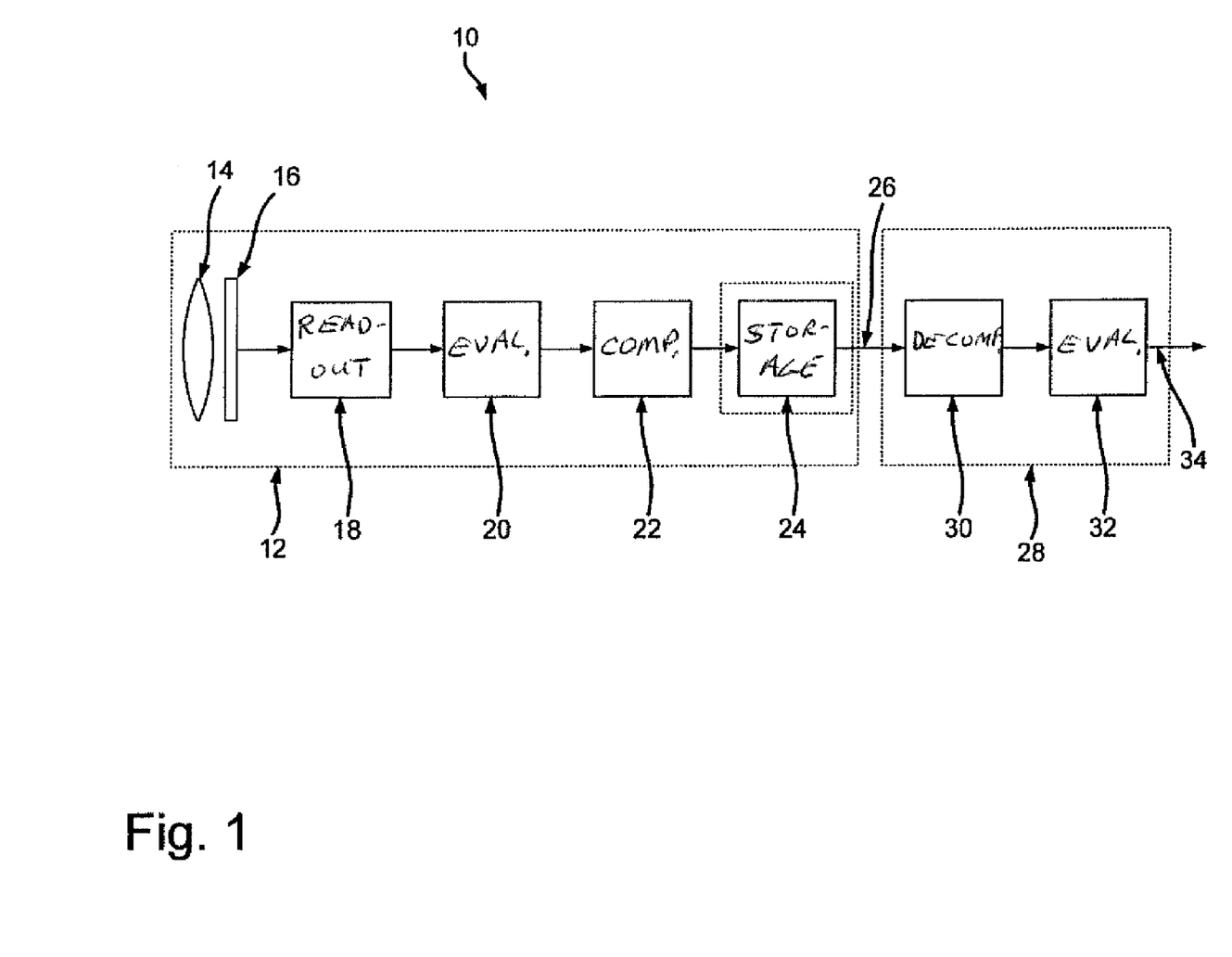
FIG. 1 a schematic representation of an image recording system in accordance with the invention in accordance with an embodiment.

In accordance with FIG. 1, an image recording system 10 in accordance with the invention includes a camera unit 12 which is in particular provided for taking motion picture films. It includes a lens 14 which images a scene (not shown) on an image sensor 16 which has a plurality of light sensitive pixels arranged in rows and columns. Image signal values are read out of the pixels by means of a readout device 18. In a first evaluation unit 20, the image signal values read out by the readout device 18 are subjected to a precalibration explained in more detail in the following, wherein first calibration values are used. The precalibrated image signal values are transferred to a compression device 22 which compresses the precalibrated image signal values so that the data quantity of the image signal values is reduced.

The calibrated and compressed image signal values are transmitted to a storage device 24 and are stored therein. The storage device 24 can be known devices for data recording which are in particular based on optical, magnetooptical or magnetic processes such as hard disks. It is preferably a solid state memory.

A separate processing unit 28 which is connectable to an output 26 of the storage device 24 is provided for the further evaluation of the precalibrated and compressed image signal values.

The precalibrated and compressed image value signals are transferred to a decompression device 30 which generates decompressed image signal values from the precalibrated and compressed image value signals, said decompressed image signal values being at least substantially identical to the precalibrated image signal values.

The decompressed image signal values are transferred to a second evaluation unit 32 in which the decompressed image signal values are corrected, i.e. postcalibrated, while using second calibration values in a manner explained in more detail in the following. In this respect, the first calibration values can optionally also additionally be used. The fully corrected image signal values thus generated are provided to an output 34. From there, they can, for example, be transferred to a further storage device, not shown, and/or to a playback device such as a monitor or a projector.

In the embodiment shown here, the storage device 24 is fixedly integrated in the camera unit 12. Alternatively, it is naturally also possible to arrange the storage unit 24 replaceably in the camera unit 12, which is indicated by the dashed frame surrounding the storage device 24. The storage device 24 taken from the camera unit 12 can then be introduced into a corresponding receiver, not shown, of the processing unit 28 and can be connected to the decompression device 30. It is furthermore also possible to combine the camera unit 12 and the processing unit 28 in a single assembly.

Furthermore, it is also possible in a further embodiment variant only to arrange the lens 14, the image sensor 16 and the readout device 18 in the camera unit 12 and to arrange the first evaluation unit 20, the compression device 22 and the storage device 24 in an assembly separated from the camera unit 12.

Optionally, not only the precalibrated image signal values, but additionally also the first calibration values and/or the second calibration values can be compressed together with the image signal values and subsequently decompressed in the decompression device 30 so that these calibration values can be extracted from the transmitted image data set in the second evaluation unit 32 and are thus directly available in the second evaluation unit 32. Only the second calibration values are preferably compressed and later decompressed again together with the image signal values.

In the following, the method in accordance with the invention for the calibration, compressing and decompression of the image signal values will be explained in more detail.

To carry out the two-stage calibration described here, it is first necessary to generate calibration data sets for the specifically used image sensor 16 which include a number of calibration values for each pixel. This is done by means of a calibration device, not shown. These calibration values, also termed total calibration values in the following, for example include at least one offset calibration value and at least one gain calibration value. The offset calibration values are generated in that the image sensor 16 is shaded and is then read out by means of the readout device 18. To determine the gain calibration values, the image sensor 16 is homogeneously illuminated, i.e. every pixel is illuminated with the same light intensity. The image sensor 16 is in turn read out by means of the evaluation device 18. The gain calibration image acquired therefrom is normed to the mean value of all image signal values. An inversion subsequently takes place, i.e. the reciprocal of the image signal values is calculated.

To carry out the calibration, the respective offset correction value is subtracted pixel-wise from the image signal value in the example shown here. The result of this subtraction is multiplied by the respective gain calibration value.

If, in addition to the linear gain correction described here, with which only linear deviations of the sensitivity of the pixels can be corrected, a correction of different nonlinearities of the amplification characteristic of the pixels is also desired, further calibration values can be determined. A plurality of images are taken at homogeneous illumination with respective different intensities for this purpose. A plurality of measured points thereby result for each pixel which can be fit by a suitable function, for example by a third order polynomial. The coefficients of this polynomial thus form the calibration values for each pixel.

First calibration values or precalibration values are now generated from these total calibration values which are stored in the first evaluation unit 20 and second calibration values or postcalibration values are generated which are stored in the second evaluation unit 32. This generation of the precalibration values and postcalibration values can take place in different manners, such as was already initially mentioned. If only one calibration value was determined for the offset correction and one calibration value was determined for the gain correction, the two correction values can thus be split into precalibration values and postcalibration values, for example.

Figure 2:
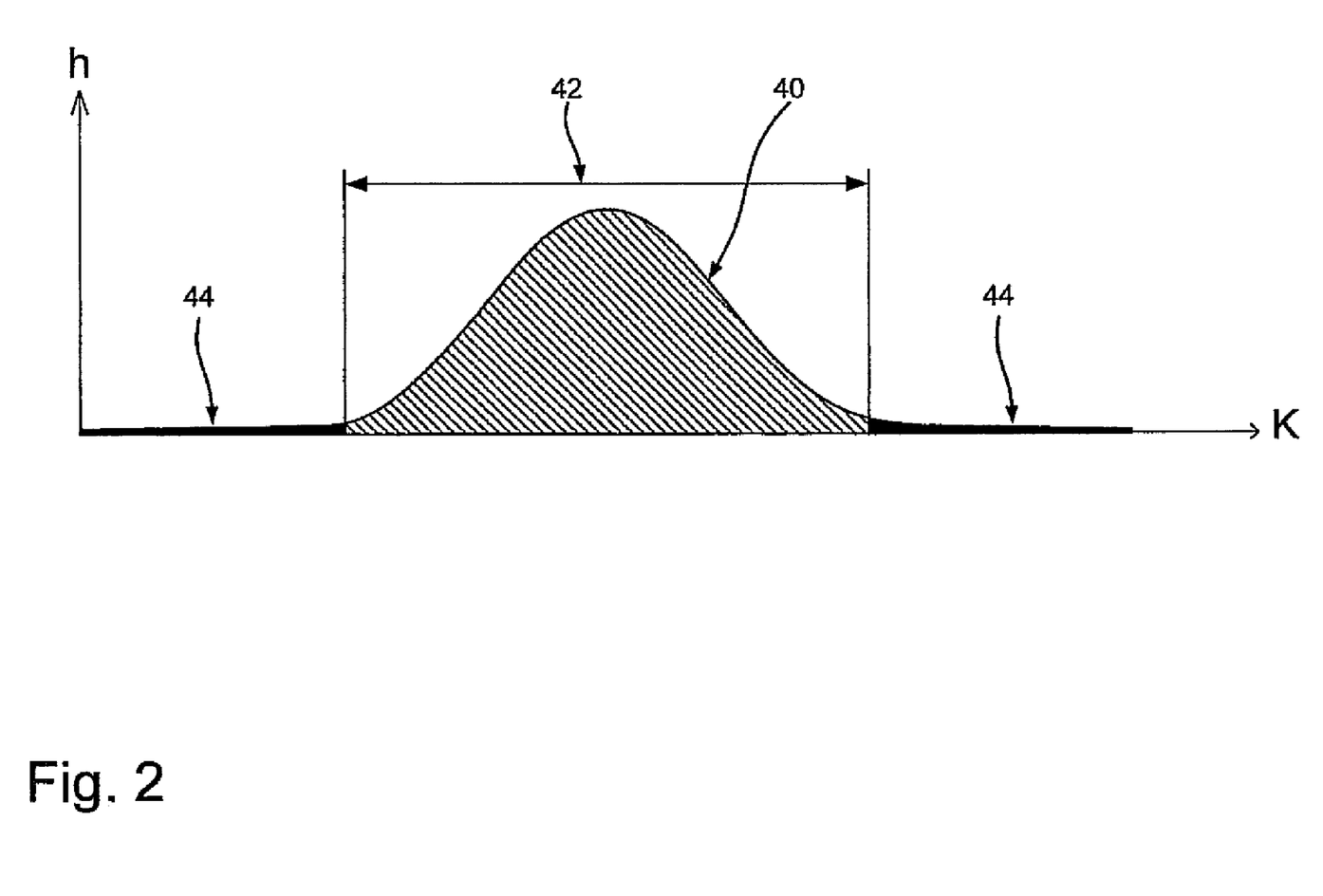
FIG. 2 a schematic representation of a distribution in which the relative frequency of calibration values is entered in dependence on the magnitude of the calibration values.

The generation of suitable precalibration values will be described with reference to FIG. 2. This shows, schematically and only qualitatively, a distribution in which in each case the relative frequency h for the occurrence of a respective calibration value K, for example for calibration values for correcting the offset, is entered into an image against the magnitude of this calibration value K. The distribution usually has a peak 40 of specific width 42 with a single maximum. Offshoots 44 which represent very small and very large calibration values which, however, occur with a very low frequency, on occasion only once or twice per image, adjoin the peak 40 at both sides. The offshoots 44 can extend much further than shown in FIG. 2. This frequency distribution can be utilized to achieve an optimum with respect to the calculation effort for the precalibration, on the one hand, and with respect to the compression efficiency, on the other hand, by a skillful selection of the precalibration values. It is not important in this respect if no correct visual perception of the respective image is achieved solely on the basis of the precalibration.

If, in accordance with an exemplary calibration method, each of the calibration values has a precision of 16 bits, a first offset calibration value and a first gain calibration value result for the precalibration and a second offset calibration value and a second gain calibration value result for the postcalibration, wherein each of these calibration values has a precision of 8 bits. Generally, however, other, non-symmetrical divisions of the precision are also possible. The precision of the precalibration values can thus be smaller than the precision of the postcalibration values, and vice versa. It is furthermore possible to use postcalibration values which have the same precision as the originally determined, complete calibration values and were generated while taking account of the precalibration which already took place on their application.

In the aforesaid example, the first calibration values can in each case include the eight lower significance bits and the second calibration values can include the eight higher significance bits. The calibration values utilized for the precalibration in this case include, for example, only the calibration values present in FIG. 2 within the peak width 42. It is thereby possible already to correct most pixels with the finest possible resolution in the precalibration. In this embodiment, only those pixels are therefore not fully corrected by the precalibration whose calibration values have a very high deviation from the respective mean value. In this respect, however, it is assumed that there are, with respect to the total number of pixels, only very few pixels for which no full calibration was carried out so that only an insignificant impairment of the subsequent compression is to be expected from these non-corrected pixels.

However, a converse association of the higher significance and lower significance bits is also possible. The total value range is then used, but with the consequence of a coarser quantification of the precalibration values.

Finally, any desired part region of adjacent bits can also be utilized as the precalibration value, i.e. both higher significance bits and lower significance bits, e.g. in each case the four bits with the least and the highest significance, are discarded so that a compromise can be found between sufficient quantification and the taking into account of a sufficiently large value range.

The selection of the value range used for the generation of the precalibration values is sensibly made so that the efficiency of the subsequent compression improves even if this precalibration itself should not yet be sufficient for a correct visual perception of the images.

After the decompression in the decompression device 30, the postcalibration then takes place in the second evaluation unit 32 on the base of the postcalibration values. In this step, in the above-named example, actually only those pixels would then be calibrated which have the above-named high deviation from the respective mean value and therefore still have to be postcalibrated for achieving the optimum image quality.

If the total calibration takes place by means of a third order polynomial already explained above, the division of the calibration values or polynomial coefficients can, for example, take place such that the coefficients of the zeroth and first orders are associated with the precalibration and are stored in the first evaluation unit 20, whereas the second and third order calibration values or polynomial coefficients are associated with the postcalibration and are stored in the second evaluation unit 32. An offset correction and gain correction then accordingly first take place in the first evaluation unit 20 within the framework of the pre calibration, whereas second and third order nonlinearities are corrected in the second evaluation unit 32 within the framework of the postcalibration.

Other associations of the calibration values to the precalibration and postcalibration are naturally also conceivable. For instance, the division with respect to the precision and with respect to the polynomial coefficients can also be combined with one another.

The above-described two-stage calibration can also be applied to those image sensors 16 which have a so-called dual gain architecture. With such a sensor, each pixel is read out via two separate outputs with different amplification so that a high degree of contrast can be achieved. With such a dual gain architecture, the number of required calibration values would double with respect to a single gain architecture. It is, however, possible, to apply a single gain correction value to both channels during the precalibration. If there are actually still specific differences between both channels, they can be corrected within the framework of the postcalibration.

Figure 3:
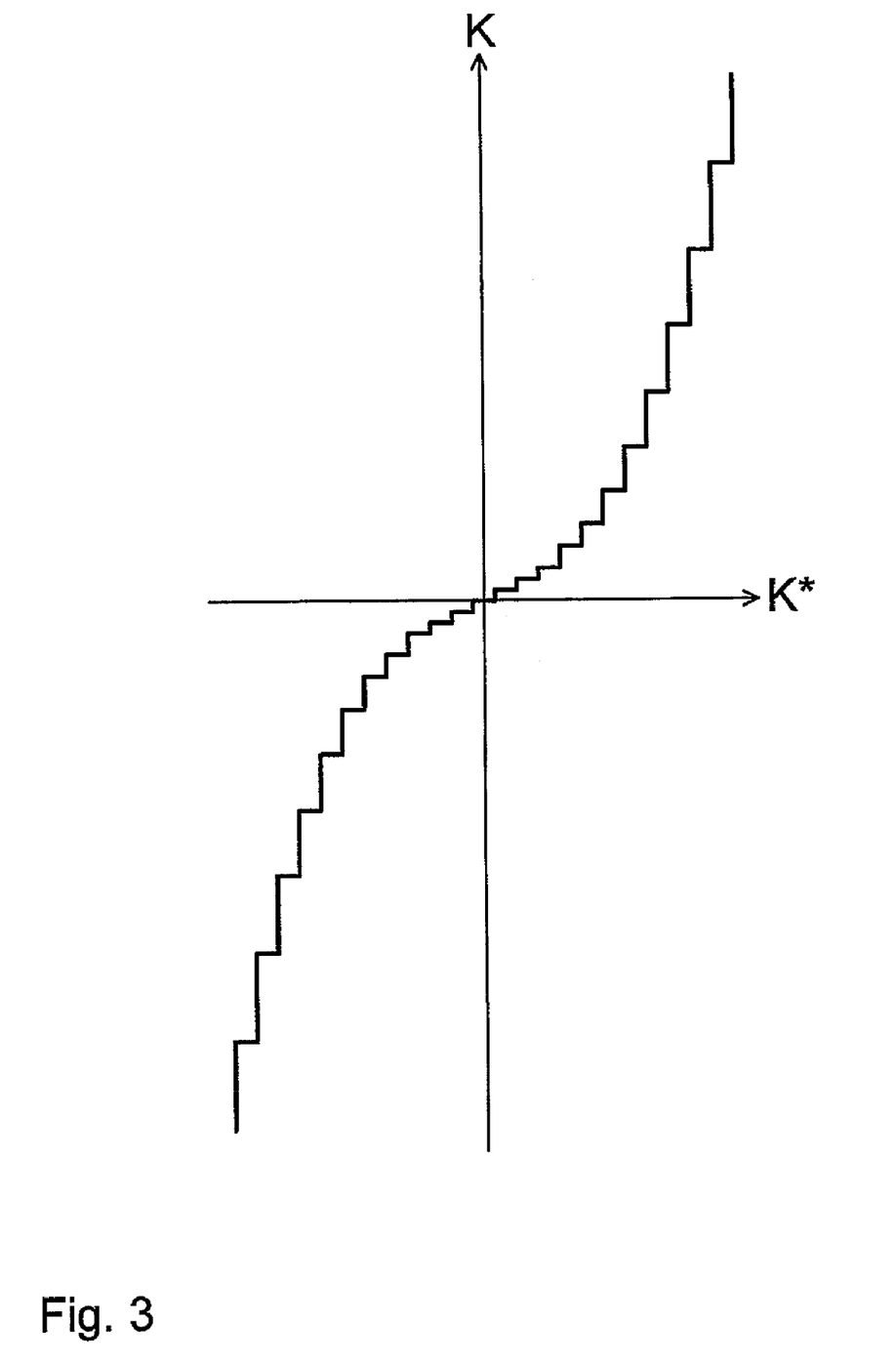
FIG. 3 a schematic representation of a nonlinear quantification characteristic for use in the generation of the calibration values.

A further reduction of the data processing effort in the calibration can be achieved in that the calibration values are encoded while using nonlinear quantification characteristics. This will be explained in the following with reference to FIG. 3. In the graph shown there, the encoded calibration values K* are applied to the abscissa, whereas the originally determined calibration values K are applied to the ordinate. The origin of the coordinate system shown is selected so that it corresponds to a standard value of the calibration values observed. As can be seen from FIG. 3, such calibration values K, which characterize a small deviation from the standard value, characterize smaller quantification stages than those calibration values K which characterize large deviations from the standard value. The named standard value stands, for example, for the mean value of the offset or the mean value of the gain for all pixels of the image sensor.

In summary, the calculation effort or the quantity of calibration data per pixel which are required in the camera before carrying out a data compression is considerably reduced by the two-stage calibration in accordance with the invention. Despite the incomplete calibration in the first calibration step, the image signal values can be compressed almost as good as fully calibrated image signal values, i.e. the required memory bandwidth is sufficiently small.

The second calibration step for generating fully calibrated image signal values can then take place on the decompressing of the image data stream in the processing unit 28, for example on an external computer. The decompression and calibration can in particular take place at a lower speed there, e.g. at a speed at which a previously taken image sequence should ultimately be played back, that is, for example, at 30 frames per second, whereas the original image sequence was taken at 200 frames per second.

The invention claimed is:

1. A method of calibrating, compressing and decompressing image signal values of an image sensor which has a plurality of light sensitive pixels arranged in rows and columns, comprising the steps:
   reading out the image signal values;
   compressing the image signal values;
   decompressing the compressed image signal values; and
   calibrating the image signal values by using calibration data sets which includes a number of calibration values for each pixel, wherein each calibration data set includes at least one first calibration value and at least one second calibration value;
   wherein the calibration of the image signal values includes a first calculation step which is carried out before the step of compressing the image signal values to calculate partly corrected image signal values while using the at least one first calibration value; and
   wherein the calibration of the image signal values includes a second calculation step which is carried out after the step of decompressing the image signal values to calculate fully corrected image signal values while using the at least one second calibration value.

2. A method in accordance with claim 1, wherein the step of compressing the image signal values includes a compression of the partly corrected image signal values.

3. A method in accordance with claim 1, wherein the second calculation step includes the calculation of the fully corrected image signal values from the decompressed, partly corrected image signal values.

4. A method in accordance with claim 1, further comprising a storage of the compressed, partly corrected image signal values.

5. A method in accordance with claim 1, wherein the at least one first calibration value includes at least one offset correction value and/or one gain correction value.

6. A method in accordance with claim 5, wherein the second calibration value includes at least one value for the correction of nonlinearities of the pixel sensitivity.

7. A method in accordance with claim 1, wherein the step of the reading out the image signal values includes at least one first and one second reading out to generate at least one first image signal value and at least one second image signal value for each pixel, wherein the first image signal value and the second image signal value are generated while using different reinforcement factors.

8. A method in accordance with claim 7, wherein at least one common first calibration value, in particular a common gain correction value, is used for calculating the partly corrected image signal values for the first image signal value and for the second image signal value of the respective pixel, wherein separate second calibration values are used for calculating the fully corrected image signal values for the first image signal value and for the second image signal value of the respective pixel.

9. A method in accordance with claim 7, wherein only the first image signal value or the second image signal value is compressed for at least some of the pixels in dependence on the magnitude of the first image signal value or of the second image signal value of the respective pixel.

10. A method in accordance with claim 9, wherein the first image signal value or the second image signal value is compressed for a transition range of the magnitude of the first image signal value and of the second image signal value of the respective pixel.

11. A method in accordance with claim 9, wherein either the first image signal value or the second image signal value is compressed for a transition range of the magnitude of the first image signal value and of the second image signal value of the respective pixel, wherein a difference value is additionally compressed which corresponds to a difference between the first image signal value and the second image signal value.

12. A method in accordance with claim 1, wherein the calibration values are generated while using nonlinear quantification characteristics, wherein those calibration values which characterize small deviations from a standard value have smaller quantification stages than those calibration values which characterize large deviations from the standard value.

13. A method in accordance with claim 1, wherein a bit depth of the first calibration value is smaller than a bit depth of a total calibration value including the first calibration value and the second calibration value.

14. A method in accordance with claim 1, wherein the at least one first calibration value and/or the at least one second calibration value is compressed and decompressed together with the image signal values.

15. A method in accordance with claim 14, wherein the at least one first calibration value and/or the at least one second calibration value is/are embedded in the image signal values and/or is added to the image signal values and/or is prefixed to the image signal values.

16. An image recording system, comprising:
an image sensor which has a plurality of light sensitive pixels arranged in rows and columns:
a readout device for reading out image signal values from the pixels;
a calibration device for generating calibration data sets which include a plurality of calibration values for each pixel;
a compression device for compressing the image signal values;
a decompression device for decompressing the compressed image signal values; and
an evaluation device which is configured to calibrate the image signal values while using the calibration data sets;
wherein each calibration data set includes at least one first calibration value and at least one second calibration value; and
wherein the evaluation device includes a first evaluation unit which is configured to calculate partly corrected image signal values while using the at least one first calibration value and a second evaluation unit which is configured to calculate completely corrected image signal values while using the at least one second calibration value;
wherein the compression device is configured for compressing the partly corrected image signal value and the second evaluation unit is configured for calculating the fully corrected image signal values from the decompressed, partly corrected image signal values.

17. An image recording system in accordance with claim 16, further comprising a storage device for storing the compressed, partly corrected image signal values.

* * * * *